July 2, 1946.    E. A. STALKER    2,403,133
AIRCRAFT
Filed Oct. 13, 1943    3 Sheets-Sheet 1
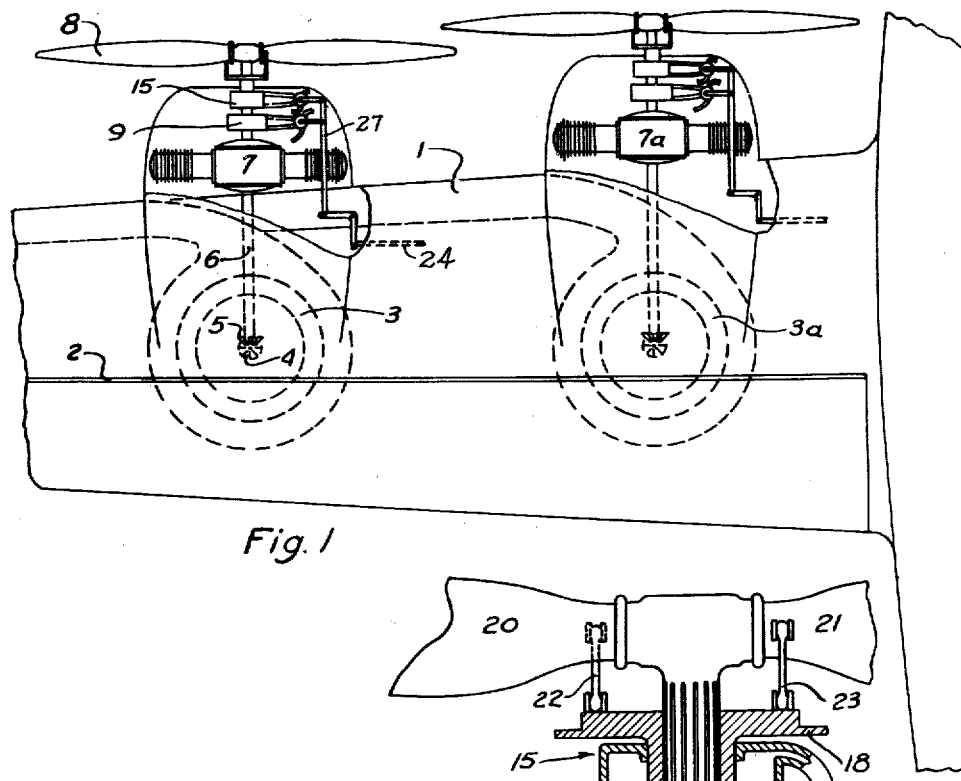
Fig. 1
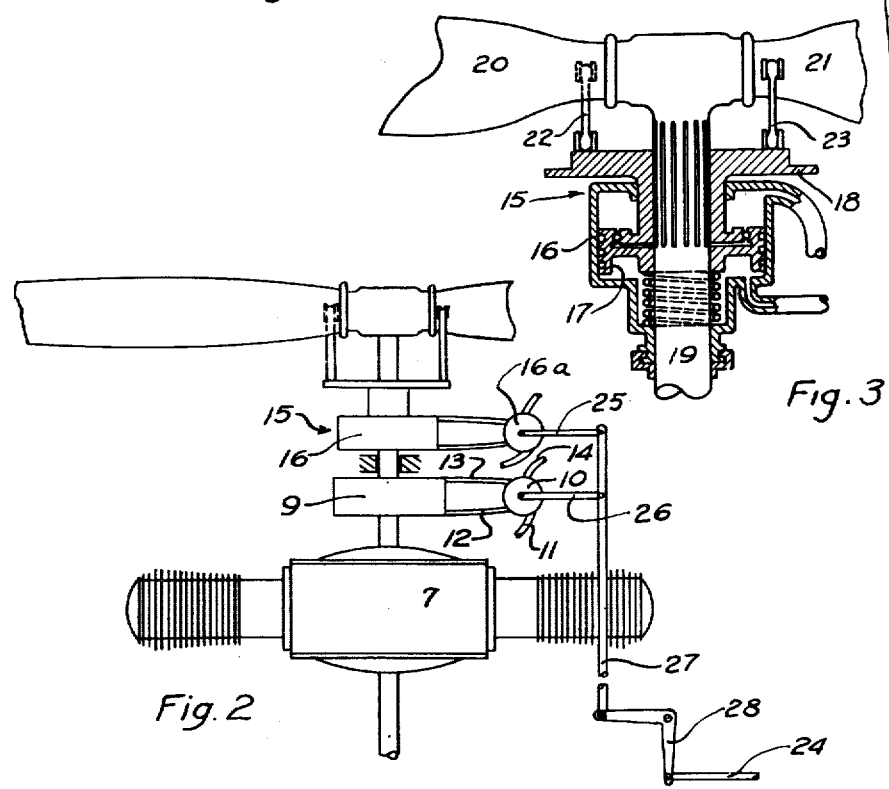
Fig. 3
Fig. 2
INVENTOR
Edward A. Stalker
By Marechal and Biebel
ATTORNEYS

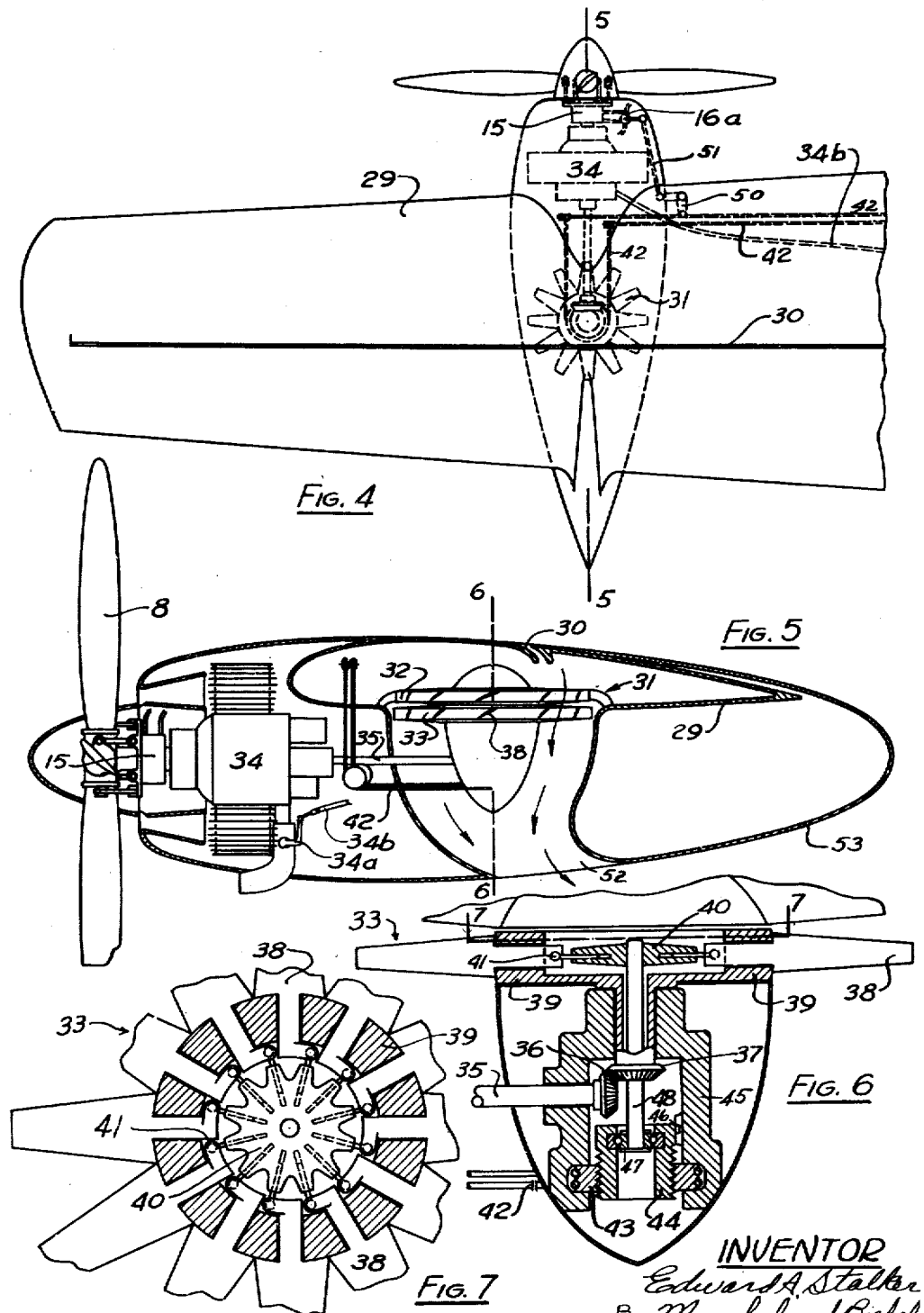

July 2, 1946.  E. A. STALKER  2,403,133
AIRCRAFT
Filed Oct. 13, 1943  3 Sheets-Sheet 3

INVENTOR
Edward A. Stalker
By Marechal & Biebel
ATTORNEYS

Patented July 2, 1946

2,403,133

UNITED STATES PATENT OFFICE 2,403,133

AIRCRAFT

Edward A. Stalker, Bay City, Mich.

Application October 13, 1943, Serial No. 506,017

9 Claims. (Cl. 244—42)

My invention relates to aircraft and more particularly to wings employing boundary layer control.

It is the principal object of the invention to provide an aircraft having boundary layer control in which a blower is provided for producing a flow through a wing slot, the control being arranged to effect an increase in the pitch of the blades of the blower accompanied by a decrease in the pitch of the propeller blades at the time maximum lift is desired as in landing.

It is a further object to provide a plurality of such combinations of engine, blower and propeller, each having such a control in which adequate power is made available for driving the blower when it is desired to develop a high lift, and in which the power absorbed by the propeller at this time is reduced so that the engine is not overloaded.

It is also an object to provide such a control in which the engine is relieved of the load of the propeller making the full power of the engine available to drive the blower when maximum lift is desired.

It is also an object to provide an aircraft in which the wing is equipped with an adjustable flap and in which in response to the lowering of the flap to develop high lift, the pitch of the propeller blades is reduced so that only limited thrust is developed under increased engine speed and concurrently therewith the pitch of the blower blades is increased to provide more effective boundary layer control.

Other objects and advantages will be apparent from the following description, the accompanying drawings, and the appended claims.

I accomplish the above objects by the means illustrated in the accompanying drawings in which—

Fig. 1 is a fragmentary plan view of an aircraft constructed in accordance with the present invention;

Fig. 2 is a schematic view of the propeller, engine and connecting parts;

Fig. 3 is a fragmentary sketch partly in section of the pitch changing device;

Fig. 4 is a fragmentary plan view of another form of the invention;

Fig. 5 is a section along the line 5—5 in Fig. 4;

Fig. 6 is a section along the line 6—6 in Fig. 5;

Fig. 7 is a fragmentary section along line 7—7 in Fig. 6;

Figure 8:
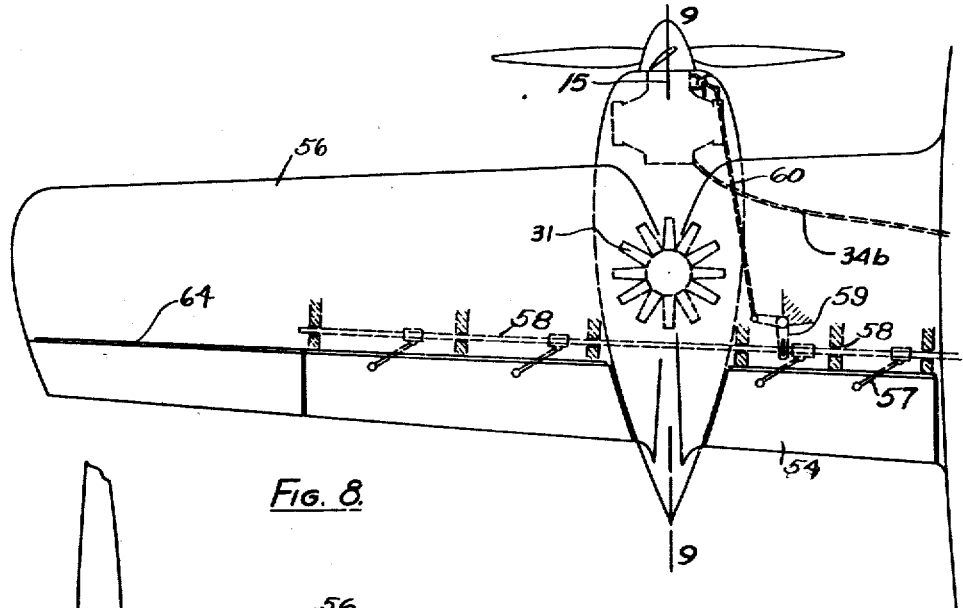
Fig. 8 is a fragmentary plan view of a further form of the invention.

This invention is directed toward a means of applying boundary layer control to current designs of airplanes, and without substantial change in the fundamental engine-propeller combination. Thus in a radial engine and propeller arrangement the engine is ordinarily between the propeller and the blower and so it is difficult to arrange for the propeller acting as a windmill to drive the blower as set forth in my U. S. Patent No. 1,913,644. To run shafting around the radial engine is too heavy, costly and complicated. Furthermore if a tractor propeller is used the wing portion back of the propeller is in a low velocity wind when the propeller is acting as a windmill.

In accordance with this invention the engine of each propeller-engine-blower unit remains in position between the propeller and the blower, and controls are provided so that when it is desired to develop high lift as for landing, the load on the engine of the propeller is reduced or eliminated, and the pitch of the blades of the blower is increased, the available engine power thus being adequate for this purpose. The engine can simultaneously be speeded up to increase its output but this does not result in materially increased forward speed or propeller load since the propeller has either been disconnected or the pitch of its blades has been substantially reduced so that it does not develop any great thrust.

Referring now more particularly to the drawings the wing is 1 having the induction slot 2 in its upper surface. The blower 3 inducts air through the slot 2 to control the boundary layer. The blower is driven by the gear train 4 of which gear 5 is fixed to the extended crankshaft 6 of the engine 7.

The engine 7 drives the propeller 8 through clutch 9 which is hydraulically operated. The valve 10 controls the flow of fluid to and from the clutch. The tube 11 conducts fluid under pressure from a suitable reservoir (not shown) to the valve 10. The other ducts 12 and 13 conduct fluid to and from the clutch. Duct 14 returns the fluid to the reservoir.

The blade attitudes are changed by the mechanism 15 shown in detail in Fig. 3. The cylinder 16 houses the piston 17 which is movable axially by the fluid pressure. The element 18 is splined to the propeller shaft 19 and rotatably borne on the piston 17 so that the propeller can rotate relative to the cylinder. The element 18 is connected to the propeller blades 20 and 21 by the links 22 and 23, respectively at a proper distance from the blade axis so that in response to an axial movement of the piston 17, the pitch of the blades is correspondingly altered.

The flow of pressure fluid to the cylinder 16 is controlled by valve 16a and suitable tubes connected to the cylinder and to the pressure source similar to those employed for valve 10.

At the time of landing the pilot moves the rod 24 which operates the valve levers 25 and 26 through the rod 27 and bell crank 28. This movement changes valve 10 so that fluid pressure is supplied to clutch 9 to effect disengagement thereof and concurrently therewith valve 16a is set to supply pressure fluid to cylinder 16 in such direction as to produce an increase in the pitch of the blades. Thus the pitch of the propeller blades is increased and with the engine disconnected from the propeller, the latter is free to windmill but because of the increased pitch setting it does not rotate at an excessive or dangerous speed.

The engine remains connected to the blower and the engine is then speeded up to drive the blower 3 at sufficient speed to effect an adequate flow through the slot 2 to augment the lift of the wing for landing. Since there are a plurality of such engine blower combinations such as 7 and 3, and 7a and 3a, the failure of one engine or even several will not destroy the high lift obtained from the slot because additional power for this purpose can be supplied from the remaining engine or engines.

In another form of the invention, Figs. 4 to 6, the blower is an axial flow type with blades adjustable as to pitch. During high speed operation the pitch of the blades is small so that little power is consumed but at the time of landing it is desired to expend a relatively large amount of power in driving the blower. It is however undesirable to expend a large amount of power in the propeller 8 when landing for two reasons: first this power is not then available to the blower, and second if the propeller consumes much power it will produce a large thrust which is undesirable at landing. On the other hand the propeller if ahead of the wing should retard the flow over the wing as little as possible.

The invention is arranged so that the pitch of the propeller is sufficient for the propeller to produce only a small thrust and small increase in wind velocity over the wing. Then the propeller need not be disengaged from the engine. The operation of the mechanism to increase the pitch of the blower blades decreases concurrently the pitch of the propeller to the proper value for landing.

In Figs. 4 to 6 the wing is 29 and the induction slot is 30. The blower is 31 composed of the stator 32 and rotor 33. The latter is driven from the engine 34 by means of the shaft 35 and gears 36 and 37. The engine also drives the propeller 8, a pitch changing device 15 as above described being also incorporated in the drive.

The engine throttle 34a is operated by the pilot by means of a flexible push-pull element within tube 34b. It is to be noted that the throttle is operable independently of the pitch changing device, the blower and/or the flap. It is therefore possible to control the power output of the engine independently of the status of operation of the propeller, blower and flap. It is important to be able to do this so that for landing conditions full power of the engine can be directed to the blower 31 the blades of which are set for high pitch, while in high speed flight full power can be directed to the propeller with the pitch increased to provide efficient propeller operation and with the pitch of the blades of the blower correspondingly reduced.

The rotor of blower 33 is composed of a plurality of blades 38 which are mounted in the hub 39 for rotation about their longitudinal axis. Each blade has a crank arm which is articulated to a spider 40 by means of a ball ended rod 41 whose ball is socketed in the crank arm of the blades. A movement of the spider vertically will thus rotate the blades in the hub and change the pitch.

The spider is moved vertically by the pilot by means of cables 42 passing about the sheave 43 which has internal threads mating with those on the block 44. The latter is splined to the housing 45 as shown at 46 providing for free axial movement of the block while preventing rotation thereof. The block carries internally thereof the ball bearing 47 which rotatably supports the shaft 48 fixed to the spider 40. When the sheave is rotated the block 44 is displaced vertically thereby raising or lowering the spider and altering the pitch.

The cable 42 is also connected to an end of the bell crank 50 which in turn is connected by rod 51 to the valve 16a which controls the pitch change device 15. Thus the pilot controls the pitches of the propeller and blower coincidentally, the connections being such that movement of the control in one direction causes reduction of the blower pitch and an inverse change or an increase in the pitch of the propeller.

The air inducted through the slot 2 is discharged from the opening 52 in the bottom of the nacelle 53.

During normal flight conditions the pilot's control is set to produce a relatively high pitch suitable for high speed flight, the pitch of the blower blades being reduced to a low value such that the major part of the power is available for the propeller.

When the airplane is to be landed the control is adjusted so that the propeller 8 is given a very low pitch so that little thrust is created and yet large enough so that there is no reduction of the wind velocity but actually a slight increase behind the propeller. Concurrently the pitch of the blower blades is increased and the engine power is in major part available to drive the blower so that maximum lift is developed.

Figure 9:
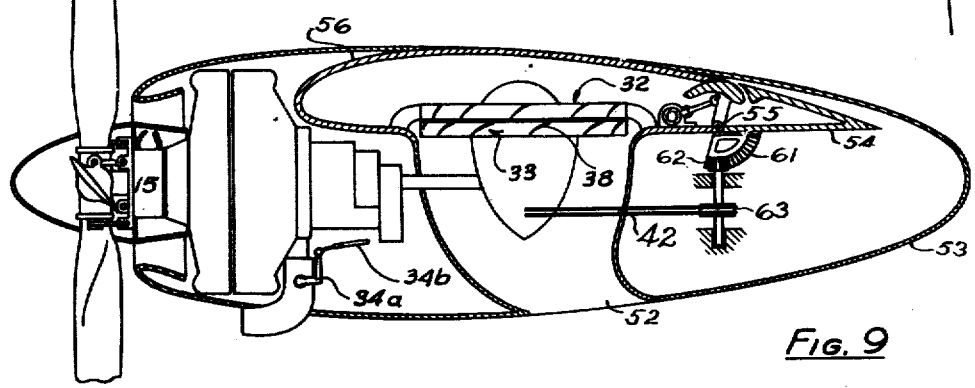
Fig. 9 is a vertical section on the line 9—9 of Fig. 8 with the flap in raised position.
Figure 10:
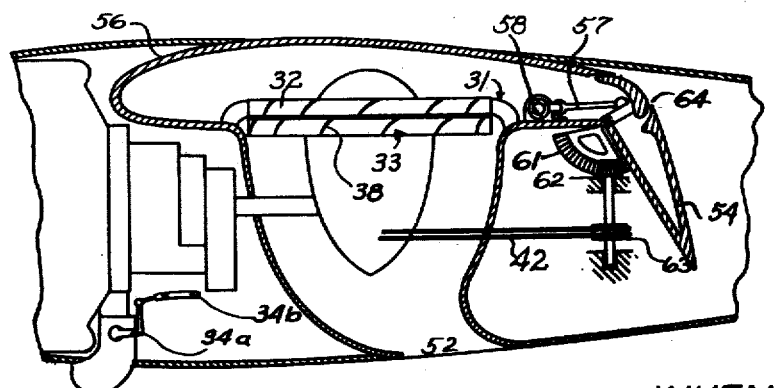
Fig. 10 is a view similar to Fig. 9 on a larger scale and with the flap lowered.

In the form of the invention shown in Figs. 8, 9, and 10 the control of the pitches of the blower and propeller is related to the operation of the flap 54 which is hinged at 55 to the main body of the wing 56. The link 57 connects the flap to the pushrod 58 whose spanwise movement displaces the end of the link rearward, moving the flap down. The propeller pitch changing mechanism 15 previously described is operatively connected to rod 58 by the bell crank 59 and link 60.

The pitch of the blower 31 is changed by means of the cables 42 as previously described, but the change is initiated by the movement of the flap. A gear sector 61 is fixed to the flap 54 within the nacelle 53 so that the hinge axis of the flap is the axis of the gear sector. A pinion 62 meshes with the gear sector and carries fixed to itself the pulley 63. When the flap is depressed the pulley 63 is rotated by the gear action, pulling cable 42 and thereby increasing the pitch of the blades of the blower. This causes a large flow through the wing slot 64 giving a large increase in lift capacity to the wing in coordinated relation to the flight conditions established by the lowering of the flap. The wing slot itself may have a uniform width throughout a major portion or even its entire range of movement and may also be arranged to provide a greater width as the flap is lowered. Through the interconnected relation with the pitch change mechanism for the propeller, the operation of lowering the flap also results in reducing the pitch of its blades so that it will not absorb power and develop a thrust unnecessarily. Conversely, upon the raising of the flap, the pitch of the blower blades is reduced and that of the propeller increased.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In an aircraft of the character described, the combination of a wing having a slot in the surface thereof leading into the wing interior, a source of power within the aircraft, means for controlling the output of said power source, an adjustable pitch propeller driven from said power source, a blower, means for operating said blower from said power source throughout the range of pitch-adjustment of said propeller for inducing a flow through said slot to develop boundary layer control on said wing, said blower having adjustable pitch blades, and a single control means operable independently of said power controlling means for effecting concurrent reduction of pitch of the blades of said propeller and increase of pitch of the blades of said blower to make the power of said power source primarily available for operation of said blower in developing high lift on said wing.

2. In an aircraft of the character described, the combination of a wing having a slot in the surface thereof leading into the wing interior, a source of power within the aircraft, an adjustable pitch propeller driven from said power source, a blower also driven from said power source for inducing a flow through said slot to develop boundary layer control on said wing during normal flight thereof and over the range of adjustment of said propeller, said blower having adjustable pitch blades, a single means for varying inversely the pitch of said propeller blades and the pitch of said blower blades, and clutch means for disconnecting said propeller from said engine.

3. In an aircraft of the character described, the combination of a wing having a slot in the surface thereof leading into the wing interior, a source of power within the aircraft, an adjustable pitch propeller driven from said power source, a blower, means for operating said blower from said power source for inducing a flow through said slot to develop boundary layer control on said wing, said blower having adjustable pitch blades, a single means for varying inversely the pitch of said propeller blades and the pitch of said blower blades to make the power of said power source primarily available for operation of said blower in developing high lift on said wing, and means for controlling the power developed by said power source over substantially the entire range independently of the controls of the pitch of the blades of said propeller and said blower.

4. In combination, in an aircraft, a hollow wing having a slot in its upper surface in communication with the wing interior, an engine, an adjustable pitch propeller, a disengageable clutch to connect said propeller to said engine, a blower in communication with the wing interior, means operably connecting the blower to the engine to receive driving power therefrom, means for operating said clutch to completely disengage the propeller from the engine so that the power of said engine is available for driving the blower to induce a flow through said slot increasing the lift of the wing, and means operable concurrently with said clutch operating means for adjusting the pitch of the propeller to a large angle, said large pitch angle serving to restrain the propeller from rotating and retarding the flow across the wing.

5. In combination in an aircraft, a hollow wing having a slot in its upper surface in communication with the wing interior, an engine having a power shaft at opposite ends thereof, a blower operably connected to one of said power shafts to derive driving power therefrom and having adjustable pitch blades, said blower being in communication with the wing interior to induce a flow through said slot, a propeller, a disengageable clutch to connect said propeller to the other of said shafts opposite said blower shaft, and a common means to operate said clutch to disengage the propeller from the engine and coincidentally to increase the pitch of the blades of the blower to absorb engine power in developing a flow through said slot.

6. In combination in an aircraft, a hollow wing having a slot in its upper surface in communication with the wing interior, an engine having power shafts at opposite ends thereof, a blower having adjustable pitch blades and operably connected to one of said power shafts to derive driving power therefrom, said blower being in communication with the wing interior to induce a flow through said slot, an adjustable pitch propeller connected to one of said shafts opposite said shaft for said blower, clutch means for disconnecting said propeller from said engine and means coincidentally to alter the pitch angle of said propeller and blower.

7. In combination, a hollow wing having a flap, control means to depress said flap, said wing having a slot in its surface in communication with the wing interior, a blower having adjustable pitch blades, a power source in continuous driving relation with said blower for operation thereof independently of the position of said flap said blower being in communication with the wing interior to induce a flow through said slot, and means controlled by movement of said flap for progressively adjusting the pitch of the blades of said blower to alter the pumping action of said blower in response to the movement of said flap.

8. In combination, a hollow wing having a slot in its upper surface and a flap, control means to depress said flap, an engine having power shafts at opposite ends thereof, means to control the power output of said engine, a blower having adjustable blades connected to one of said power shafts to derive driving power therefrom, said blower being in communication with said slot to induce a flow therethrough, means to alter the pitch angle of the blades of the blower, an adjustable pitch propeller connected to the power shaft opposite the shaft for said blower, and means operably connecting said flap control means to said blower and to said propeller independently of said engine control means to adjust the blades thereof oppositely to alter the effectiveness of said blower and the pitch angle of said propeller coincidentally with the movement of said flap.

9. In combination in an aircraft, a hollow wing having a slot in its surface and a flap, means to depress said flap, an engine, a propeller operably connected to said engine to propel the aircraft, a blower having adjustable pitch blades and operably connected with said engine in both the raised and depressed positions of said flap, said blower being in communicaton with said slot to induce a flow therethrough in both the raised and depressed positions of said flap, means to depress said flap, and means to change the pitch of the blades of said blower in direct response to movement of said flap.

EDWARD A. STALKER.

Certificate of Correction

Patent No. 2,403,133.  July 2, 1946.

EDWARD A. STALKER

It is hereby certified that error appears in the printed specification of the above numbered patent requiring correction as follows: Column 6, lines 29 and 30, claim 5, strike out "a common" and insert the same after "and" in line 46, claim 6; and that the said Letters Patent should be read with this correction therein that the same may conform to the record of the case in the Patent Office.

Signed and sealed this 5th day of November, A. D. 1946.

[SEAL]

LESLIE FRAZER,
*First Assistant Commissioner of Patents.* pendently of said engine control means to adjust the blades thereof oppositely to alter the effectiveness of said blower and the pitch angle of said propeller coincidentally with the movement of said flap.

9. In combination in an aircraft, a hollow wing having a slot in its surface and a flap, means to depress said flap, an engine, a propeller operably connected to said engine to propel the aircraft, a blower having adjustable pitch blades and operably connected with said engine in both the raised and depressed positions of said flap, said blower being in communicaton with said slot to induce a flow therethrough in both the raised and depressed positions of said flap, means to depress said flap, and means to change the pitch of the blades of said blower in direct response to movement of said flap.

EDWARD A. STALKER.

Certificate of Correction

Patent No. 2,403,133.     July 2, 1946.

EDWARD A. STALKER

It is hereby certified that error appears in the printed specification of the above numbered patent requiring correction as follows: Column 6, lines 29 and 30, claim 5, strike out "a common" and insert the same after "and" in line 46, claim 6; and that the said Letters Patent should be read with this correction therein that the same may conform to the record of the case in the Patent Office.

Signed and sealed this 5th day of November, A. D. 1946.

[SEAL]

LESLIE FRAZER,
*First Assistant Commissioner of Patents.*